(12) United States Patent (10) Patent No.: US 8,427,348 B2
Sagar (45) Date of Patent: Apr. 23, 2013

(54) PARALLEL PROCESSING OF SEQUENTIALLY DEPENDENT DIGITAL DATA

(76) Inventor: Arun Kumar Sagar, Kenmore, WA (US)

( * ) Notice: Subject to any disclaimer, the term of this patent is extended or adjusted under 35 U.S.C. 154(b) by 81 days.

(21) Appl. No.: 13/107,392

(22) Filed: May 13, 2011

(65) Prior Publication Data

US 2011/0279294 A1 Nov. 17, 2011

Related U.S. Application Data

(60) Provisional application No. 61/334,861, filed on May 14, 2010.

(51) Int. Cl.
*H03M 9/00* (2006.01)
(52) U.S. Cl.
USPC ............................................. 341/100; 341/50
(58) Field of Classification Search .................. 341/101, 341/100, 58
See application file for complete search history.

(56) References Cited

U.S. PATENT DOCUMENTS

| | | | |
|---|---|---|---|
| 5,379,070 A | 1/1995 | Retter et al. | |
| 5,703,580 A * | 12/1997 | Ko | 341/59 |
| 6,043,765 A * | 3/2000 | Twardowski | 341/65 |
| 2005/0004963 A1 | 1/2005 | Guo et al. | |
| 2007/0009166 A1 | 1/2007 | Ju | |
| 2010/0195922 A1* | 8/2010 | Amano et al. | 382/233 |

* cited by examiner

*Primary Examiner* — Brian Young (74) *Attorney, Agent, or Firm* — White & Case LLP (57) ABSTRACT

Systems and methods decode sequentially-dependent data by using a plurality of processing units substantially in parallel. A splitting procedure determines at least one splitting point dividing a data-stream into at least two portions and each processing unit is assigned one portion of the data-stream for decoding. A skimming procedure is performed by at least one processing unit to decode relevant data for at least one portion of the data-stream, where the relevant data is sufficient to enable a processing unit to fully decode another portion of the data-stream. Each processing unit then performs a scanning procedure to fully decode its assigned portion of data-stream substantially in parallel.

31 Claims, 10 Drawing Sheets

FIG. 1

(Prior Art)

FIG. 2

(Prior Art)

PARALLEL PROCESSING OF SEQUENTIALLY DEPENDENT DIGITAL DATA

CROSS-REFERENCE TO RELATED APPLICATION

This application claims the benefit of U.S. Provisional Application No. 61/334,861, entitled "Parallel Processing of Sequentially Dependent Digital Data," filed May 14, 2010. The subject matter of the related application is hereby incorporated by reference.

FIELD OF THE INVENTION

The present invention relates generally to parallel processing of digital data, and more particularly, to enhancing the processing speed of sequentially dependent digital data with multiple processors.

BACKGROUND

Figure 1:
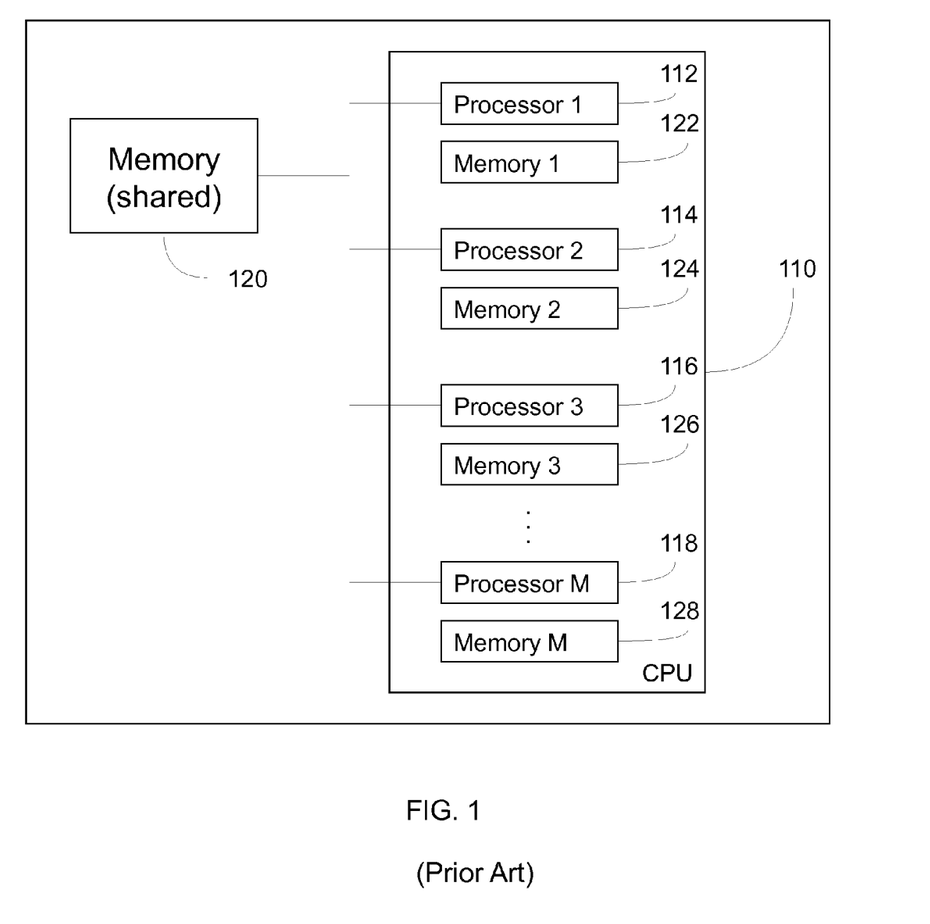
FIG. 1 is a block diagram of a multiple-processor machine.

Moore's law describes a long-term trend in the history of computing hardware, in which the processing power of computers doubles approximately every 18 months. The capabilities of many digital electronic devices are strongly linked to Moore's law: processing speed, memory capacity, sensors, and even the number and size of pixels in digital cameras. In recent years, this has encouraged microprocessor makers to include more than one processor (i.e., core) in a single package to further enhance the processing speed and power of computing devices. In FIG. 1, for example, a Central Processing Unit 110 (CPU) contains a plurality of processors (Processor$_1$ 112, Processor$_2$ 114, Processor$_3$ 116, to Processor$_M$ 118). Each of the plurality of processors may also have a local memory attached to it (Memory$_1$ 122, Memory$_2$ 124, Memory$_3$ 126, ... Memory$_M$ 128). The plurality of processors may be embodied on separate substrates or may be embodied on a single substrate as processor cores, and the plurality of processors includes at least two processors.

For an M-processor machine, if an input data-stream could be evenly divided into M portions then assigned to each of M processors, in theory the same data-stream that a single-processor machine would take time T to decode will only take time T/M on an M-processor machine. In practice, however, there is always an overhead associated with splitting an input data-stream into M portions of data, distributing them to each processor, processing them in synchrony, and after processing, assembling the result into a single coherent output form.

Using data compression and encryption as an example, many data compression and cryptographic formats are optimized for serial transmission and processing. In order to save space, remove redundancies, and exploit some form of frame-to-frame coherency (i.e., where adjacent data items are related to each other rather than being completely random), an efficient form of compression or encryption typically produces a string of bits where later bits are determined by previous bits. For instance, an uncompressed numerical sequence "2 3 4 5 6" can be compressed as "2+1+1+1+1," where only the initial value and the delta value (+1) is stored. As a result, to decompress such data, one must start from the very beginning (i.e., "2") to get all the subsequent values. If the decoding machine starts randomly in the middle of the compressed data, it will only see a "+1" without knowing which base value such delta value is dependent on.

As another example, image compression is commonly used in reducing large volumes of data in digitized images for economical storage and for transmission via communication networks having limited bandwidth. For the purpose of illustration, consider a 2-dimensional image that is stored by using the Windows Bitmap File format (BMP) in an uncompressed form. Assume each pixel in the image takes one byte of storage and an image with dimensions W by H (W×H) is stored in a linear sequence as W bytes multiplied by H bytes. That is, the first row of W bytes is written first, followed by the second row of W bytes, and so on until all H rows are fully recorded. Processing this kind of uncompressed data in parallel by multiple processors for display is straightforward. For example, if there are exactly H processors available in a machine and the starting file position is FileStart, the machine can assign a starting position to each processor as follows:

Processor 1: *FileStart*

Processor 2: *FileStart* + (1 ∗ *W*)

Processor 3: *FileStart* + (2 ∗ *W*)

...

Processor H: *FileStart* + ((*H* − 1) ∗ *W*)

By doing so, each processor only reads W bytes of information starting from the starting position assigned to it so that the machine can read the whole image file in 1/H of the time it would have taken by using a single processor to read the same image data. It should be noted that in certain situations the machine with H processors can do the task in less than 1/H time. This factor here is merely used as a convenient placeholder metric of optimal performance of an algorithm.

Now consider an image that is stored in the compressed form of BMP. There are two different types: RLE8 (run length encoded 8-bit pixels) and RLE 4 (run length encoded 4-bit pixels). In either format data are re-encoded but no positional information is stored. Hence, when given an arbitrary position in a compressed BMP file, a processor cannot tell which pixel of the image is associated with that file position without having decompressed all the bytes preceding it. Namely, a multiple-processor machine may not process the compressed BMP file in parallel because it is unable to assign to each processor a file position showing which pixel of the image the processor should start with.

Figure 2:
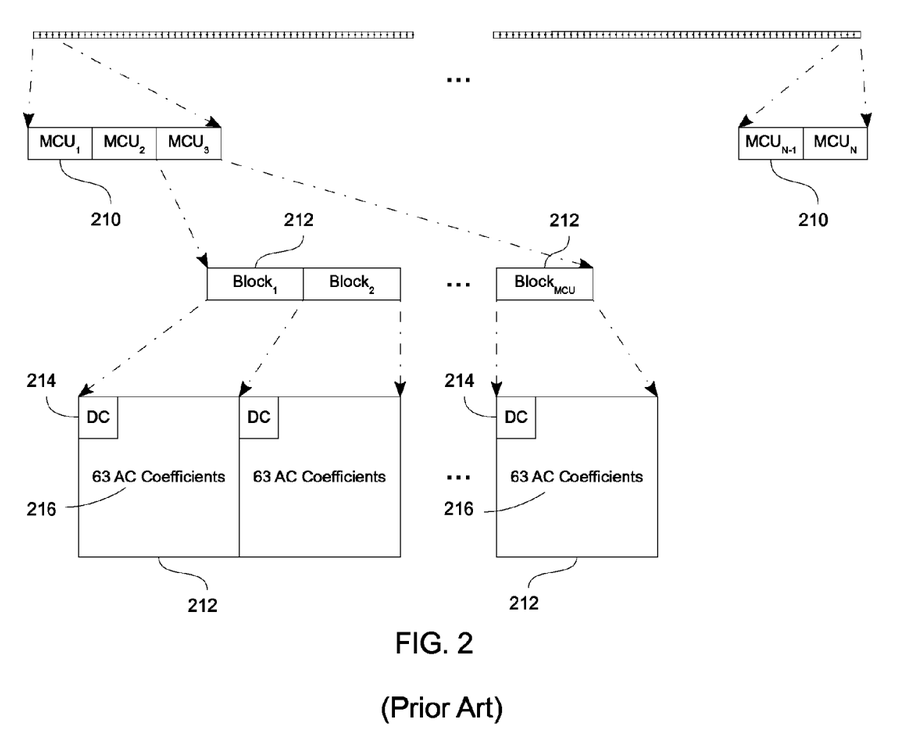
FIG. 2 is a block diagram of a decoded JPEG data-stream that is logically a sequence of MCUs.

The Joint Photographic Experts Group (JPEG) is another well-known color image compression standard. A JPEG data-stream consists of metadata and image information encoded as a compressed entropy stream. At the basic level, the stream consists of well-defined segments that contain the metadata or indicate the beginning of the compressed data-stream. Although several different encoding and decoding methods are specified in the International Telecommunication Union specification, Baseline Sequential is the most often used in practice. For this specification, the image data is organized and stored as a continuous linear sequence of 8×8 blocks that are quantized further for lossy compression. As shown in FIG. 2, an input JPEG data-stream includes a plurality of Minimum Coded Units (MCU) 210, each of which includes a plurality of blocks 212. Each block 212 is an 8×8 array of coefficients that includes one DC coefficient 214 and sixty-three AC coefficients 216. Below is a brief description of how a Huffman-encoded JPEG decoder functions at a logical level to decompress a JPEG data-stream:

1. The decoder reads data from the JPEG data-stream byte by byte and determines if a JPEG marker is present. If so, the decoder reads only as many subsequent bytes as indicated by the marker.

2. Depending on the markers, the decoder loads and updates Huffman tables and Quantization tables as they are encountered.
3. The decoder decodes the Huffman-encoded entropy data in a way that produces an 8×8 block of coefficients.
4. The decoder then dequantizes these coefficients using the currently active Quantization table. The decoder processes the dequantized data by an inverse Discrete Cosine Transform (iDCT) function to produce the raw pixels of the image.

JPEG data-streams are inherently sequential in nature as the DC coefficient of a block can only be determined after the DC coefficient of the previous block has already been decoded. This makes parallel processing of a JPEG data-stream extremely difficult and as a result, currently only one processor in a multiple-processor machine can be used to decode a JPEG data-stream.

SUMMARY

In one embodiment, a one-phase decoding method uses a plurality of processors to decode sequentially-dependent digital data in parallel. A splitting procedure determines splitting points of an input data-stream and each processor is assigned a portion of the input data-stream defined by a pair of splitting points to decode. Each processor then performs a skimming procedure, starting at the beginning of the input data-stream, to decode only relevant data until it reaches its first assigned splitting point. The relevant data decoded during the skimming procedure enables the processor to fully decode its assigned portion of the input data-stream once it reaches its assigned splitting point. For JPEG data, the relevant data includes the DC coefficients for each block in the input data-stream. Compared to using a single processor, processing the sequentially-dependent data using the one-phase decoding method significantly improves the decoding performance by using a plurality of processors working in parallel.

In another embodiment, a two-phase processing method uses a plurality of processors to decode sequentially-dependent digital data in parallel. A splitting procedure determines splitting points of an input data-stream and each processor is assigned a portion of the input data-stream defined by a pair of splitting points to decode. In the first phase, a skimming procedure decodes relevant data for the entire input data-stream and records the internal state information at the splitting points. For JPEG data, the relevant data includes the DC coefficients for each block in the input data-stream and the internal state information includes the DC coefficients at each of the splitting points. In the second phase, each of the plurality of processors begins decoding the input-data stream from its first assigned splitting point in parallel by using the internal state information stored in the first phase.

DETAILED DESCRIPTION

Figure 3:
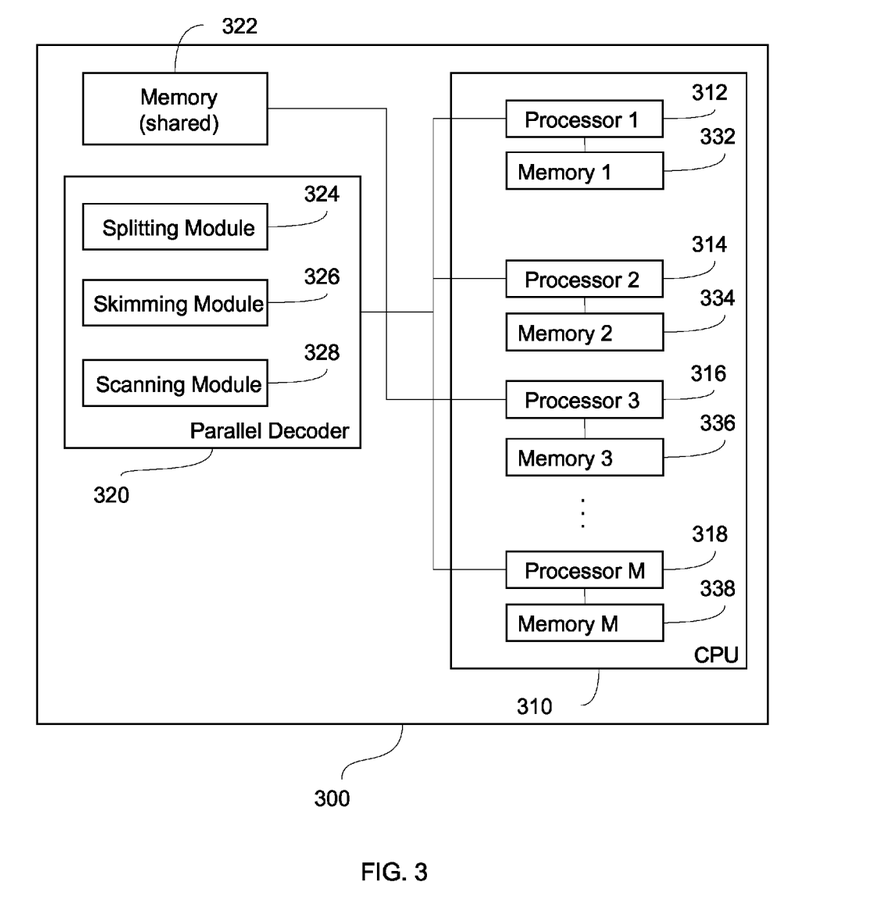
FIG. 3 is a block diagram of a system for decoding sequentially-dependent data in parallel according to one embodiment of the invention.

FIG. 3 is a block diagram of a system 300 for decoding sequentially-dependent data in parallel according to one embodiment of the invention. System 300 includes, but is not limited to, a CPU 310, a parallel decoder 320, and a memory 322. CPU 310 includes a plurality of processors and a plurality of local memories such that each processor has an associated local memory. For example, processor 312 has associated local memory 332. Parallel decoder 320 includes a splitting module 324, a skimming module 326, and a scanning module 328. Splitting module 324 is used to perform a splitting procedure that determines the splitting points of an input data-stream. Skimming module 326 is used to perform a skimming procedure in which a processor decodes only relevant portions of the input data-stream and skips irrelevant portions. Scanning module 328 is used to perform a scanning procedure that fully decodes portions of the input data-stream. These procedures are discussed in detail below.

Figure 4:
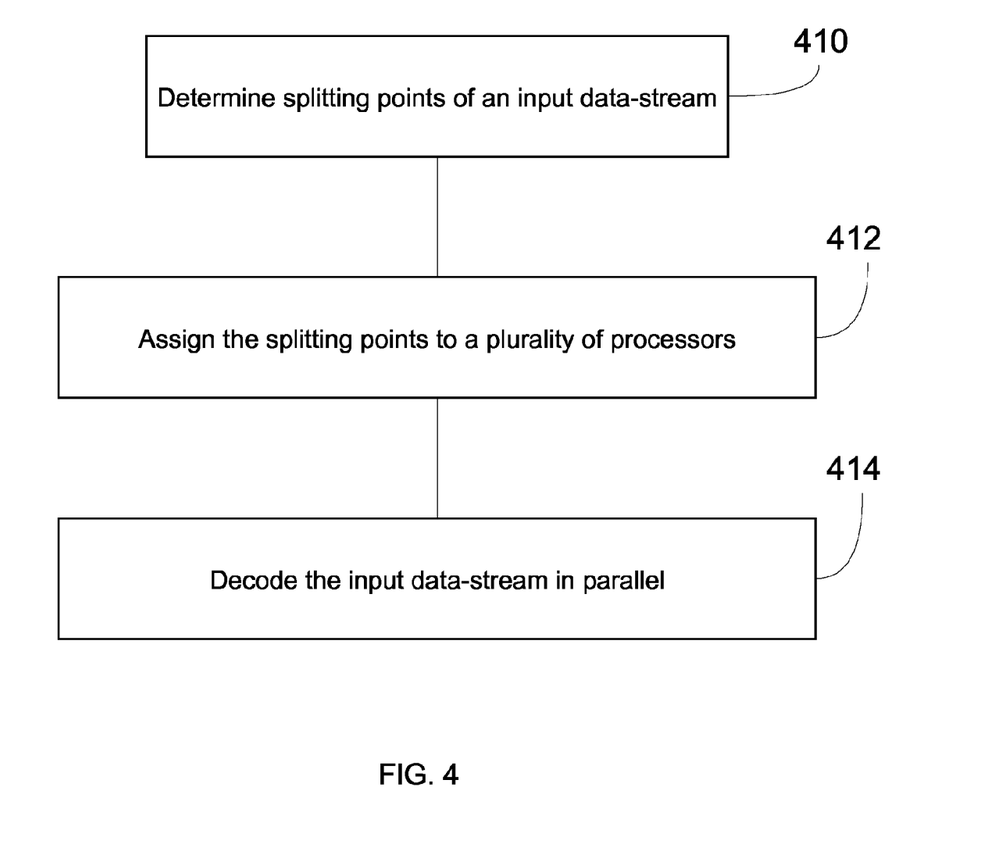
FIG. 4 is a flowchart of method steps for decoding sequentially-dependent data using a plurality of processors in parallel according to one embodiment of the invention.

FIG. 4 is a flowchart of method steps for decoding sequentially-dependent data according to one embodiment of the invention. In step 410, a splitting procedure determines splitting points of an input data-stream. The splitting points define portions of the input data-stream that will be subsequently processed by a plurality of processors in parallel. The locations of the splitting points in the input data-stream depend on the number of available processors and other computing resources available at the time of decoding (memory, cost, time, etc). Different schemes for determining the splitting points of the input data-stream may provide better performance for a given set of available resources including, but not limited to, evenly splitting the input data-stream among the plurality of processors based on the data size of the input data-stream or the predicted size of the output data-stream.

In step 412, the splitting procedure assigns a pair of splitting points to each of the plurality of processors as the start and stop positions for performing a scanning procedure on the portion of the input data-stream defined by the pair of splitting points. For the purposes of the present application, "scanning procedure" refers to a typical procedure for fully decoding an input data-stream encoded using a known data format, for example BMP or JPEG. While each of the plurality of processors is performing a scanning procedure, each portion of the decoded output data-stream and each processor's internal state information (registers, memory, pointer, etc.) can be stored. In step 414, the plurality of processors begins decoding the input data-stream in parallel.

Figure 5:
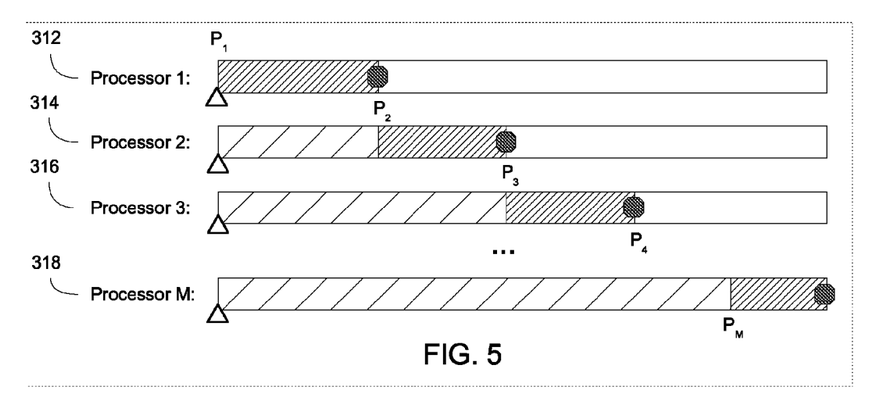
FIG. 5 is a diagram of one embodiment of implementing step 414 of FIG. 4 according to the invention.

FIG. 5 is a diagram of one embodiment of implementing step 414 of FIG. 4 according to the invention. In the FIG. 5 embodiment, M processors are available to perform the decoding. Each of the M processors starts at the beginning of the input data-stream. Processor$_1$ 312 performs the scanning procedure to fully decode data between the beginning of the input data-stream, splitting point $P_1$, and splitting point $P_2$. Processor$_2$ 314 performs a skimming procedure on the input data-stream until it reaches the first splitting point assigned to it, splitting point $P_2$. Processor$_2$ 314 then begins performing the scanning procedure to fully decode the data between splitting point $P_2$ and splitting point $P_3$. The other processors (e.g., processor$_3$ 316 to processor$_M$ 318) perform the skimming procedure on the input data-stream until they reach their first assigned splitting point, then switch to the scanning procedure to fully decode the portion of the input data-stream defined by their assigned splitting points.

The skimming procedure is a technique that enables a processor to run through an input data-stream quickly, without processing it fully, yet decode enough information to enable full decoding of its assigned portion of the input data-stream. It should be noted that every data format presents a unique structure which may require a specialized skimming procedure. Based on the complexity and flexibility presented in many data formats, multiple skimming procedures may be needed to decode data efficiently.

For example, a JPEG data-stream is sequential in nature as the actual value of the DC coefficient in any block is determined from the values of the DC coefficients in the previous blocks. In other words, the DC coefficient of a block can only be determined after the DC coefficient of the previous block has already been decoded. In the scanning procedure for JPEG-encoded data, the DC coefficient of a block is determined after the previous block has been fully decoded. In contrast, the skimming procedure causes each processor that is assigned a starting splitting point (e.g., processor$_2$ 314 to processor$_m$318) to decode only the DC coefficient of each block prior to the first assigned splitting point while skipping the AC coefficients of each of those blocks. By doing so, each processor can reach its first assigned splitting point more quickly than if it performed full decoding. The skimming procedure provides each processor with the DC coefficient of the block immediately preceding its first assigned splitting point so that the processor can fully decode its assigned portion of the input data-stream.

In a simple example, a JPEG data-stream includes 6 MCUs and each MCU contains a single 8×8 block. Using the method of FIG. 4, a 3-processor machine first performs the splitting procedure to determine splitting points of the JPEG data-stream. In this example, the splitting procedure splits the JPEG data-stream based on MCUs and assigns the first three MCUs to the first processor, the fourth and fifth MCUs to the second processor and the sixth MCU to the third processor. The first processor performs a scanning procedure to fully decode the first three MCUs. The second processor performs a skimming procedure to decode only the DC coefficients of the first three MCUs and skips all of the AC coefficients in those MCUs. When it encounters its first assigned splitting point, which is the beginning of the fourth MCU in this example, the second processor stops the skimming procedure and starts performing a scanning procedure to decode the entire 8×8 block of the fourth MCU and the entire 8×8 block of the fifth MCU. Similarly, the third processor performs a skimming procedure to decode only the DC coefficients in the first five MCUs and skips all the AC coefficients. When it encounters its first assigned splitting point, the beginning of the sixth MCU, the third processor stops the skimming procedure and starts performing the scanning procedure to decode the entire 8×8 block of the sixth MCU. Because all three processors process portions of the JPEG data-stream in parallel, the processing of the JPEG data-stream is faster than a single processor fully decoding each MCU in sequence. Although this example was limited to a JPEG data-stream including only six 8×8 blocks of image data, the method of FIGS. 4 and 5 may be used to decode a JPEG data-stream including any number of MCUs and any number of 8×8 blocks of image data.

Figure 6:
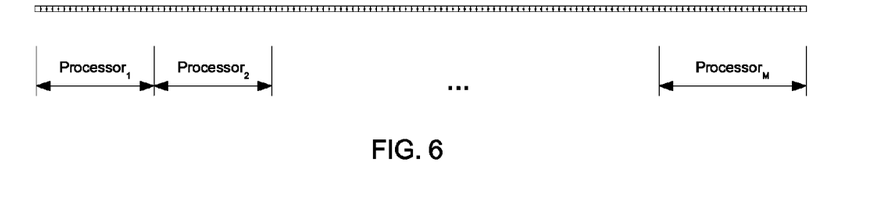
FIG. 6 is a diagram of one embodiment of assigning a sequence of data-stream positions to each of a plurality of processors according to the invention.
Figure 7:
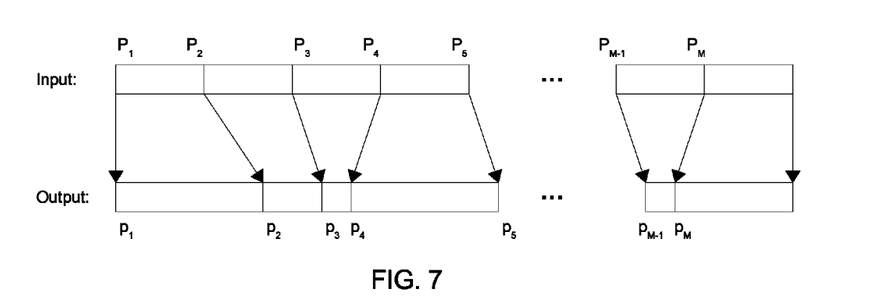
FIG. 7 is a diagram of one embodiment of assigning equally-spaced splitting points in an input data-stream according to the invention.

FIG. 6 is a diagram of one embodiment of assigning a sequence of data-stream positions to each of a plurality of processors according to the invention. The splitting procedure determines a pair of exact positions in an input data-stream that are assigned to each of the plurality of processors. How these positions are determined is based on the data format and the available resources. In one embodiment, the splitting points are best determined by considering the natural boundaries of the output data-stream (e.g., pixel/block segmentation). In another embodiment, the splitting points can be determined by simply picking the best natural boundaries in the input data-stream. These considerations may vary from format to format, and for a given format, different segmentation schemes or different trade-off considerations during processing time may also be taken into account. The splitting points can be determined in several different ways, including but not limited to assigning each processor an equal portion of the input data-stream, or assigning each processor a different amount of data so that each processor will finish decoding its assigned portion of the input data-stream at about the same time. A splitting procedure can split the input data-stream based on either the data size of the input-data stream or the predicted data size of the output data-stream. For example, the splitting points can be determined by the following methods:

Evenly dividing the input data-stream based on data size as illustrated in FIG. 7 where the uniform-sized portions of the input data-stream may map to different sized-portions of the output data-stream.

Figure 8:
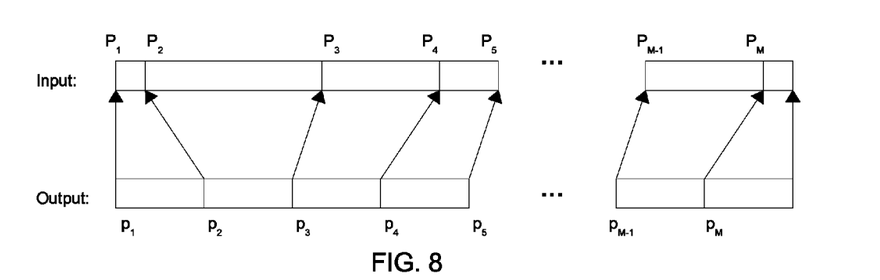
FIG. 8 is a diagram of another embodiment of assigning splitting points in an input data-stream according to the invention.

Evenly dividing the output data-stream based on data size as illustrated in FIG. 8 where a multiple-processor machine may predict the size of the output data-stream while reading the input data-stream.

Figure 9:
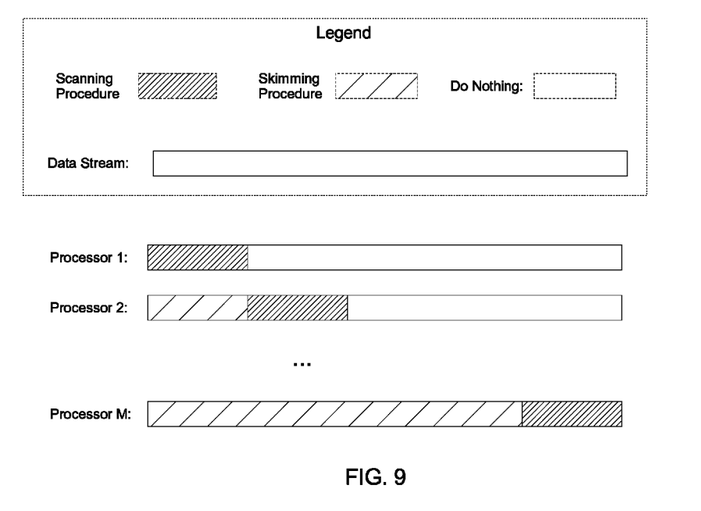
FIG. 9 is a diagram of one embodiment of the total time used by each of a plurality of processors when assigned a similar amount of an input data-stream according to the invention.
Figure 10:
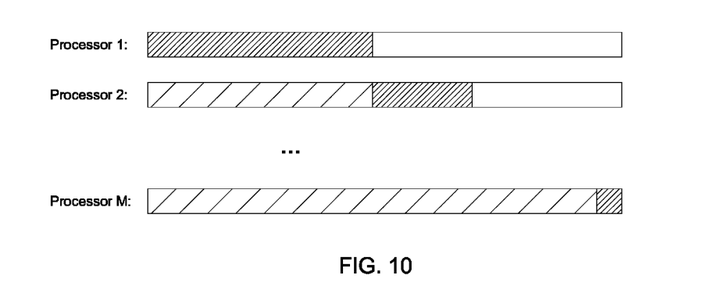
FIG. 10 is a diagram of one embodiment of the total time used by each of a plurality of processors when assigned a different amount of an input data-stream according to the invention.

Unevenly dividing the input data-stream by assigning more data to certain processors. Although a multiple-processor machine may assign uniform-sized portions of the input data-stream to each processor, this may not result in the best performance. If a single-processor machine will take time T to fully process an input data-stream of size S, an M-processor machine may only need approximately T/M time to complete decoding the same input data-stream if an ideal algorithm is applied. However, as shown in FIG. 9, when an input data-stream is evenly divided based on data size, the actual running time for the whole process is determined by the processor that performs the skimming procedure the longest (e.g., processor$_M$ in FIG. 9), even though the running time for the scanning procedure is the same for all processors. As a result, in the preferred embodiment of the splitting procedure, the data distribution for parallel processing is so that the total running time (skimming time plus scanning time) for all processors is substantially the same. Since the time used by the skimming procedure is not adjustable, one embodiment of the splitting procedure assigns more data to those processors that have shorter processing times for the skimming procedure. For example, in FIG. 10, processor) is assigned the most data to fully decode since it does not perform the skimming procedure. Also, the input data-stream can be unevenly assigned based on the size of the input data-stream or the predicted size of the output data-stream.

Figure 11:
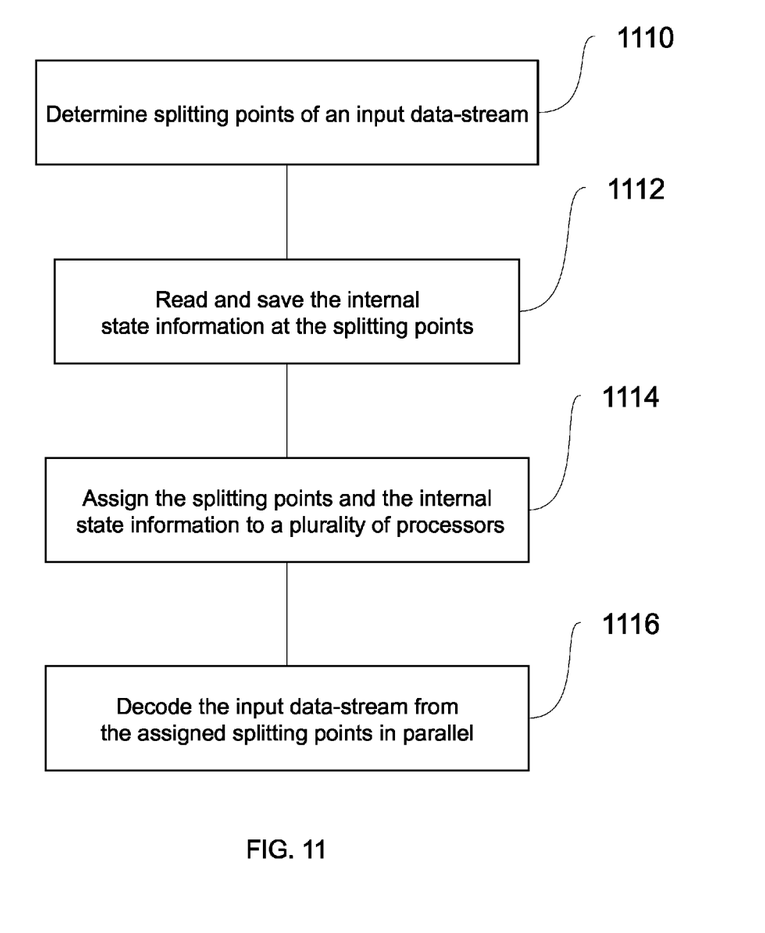
FIG. 11 is a flowchart of method steps for decoding sequentially-dependent data using a plurality of processors in parallel according to another embodiment of the invention.
Figure 12:
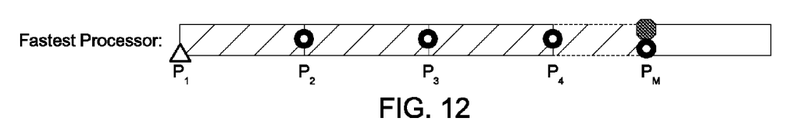
FIG. 12 is a diagram of one embodiment of implementing step 1112 of FIG. 11 according to the invention.

FIG. 11 is a flow chart of method steps for decoding sequentially-dependent data using a plurality of processors in parallel according to another embodiment of the invention. The FIG. 11 embodiment is a two-phase method. In step 1110, a splitting procedure determines splitting points of an input data-stream. In step 1112, the first phase of the two-phase method, one processor in a multiple-processor machine performs a skimming procedure and records the internal state information at the splitting points determined by the splitting procedure. For example, the fastest processor in a multiple-processor machine can be used to perform a skimming procedure on the entire input data-stream and save the internal state information at the splitting points. The internal state information at each of the splitting points includes the relevant information necessary for a processor to fully decode the portion of the input data-stream starting at the splitting point. As shown in FIG. 12, the splitting points are fixed at $P_1$, $P_2$, $P_3$ . . . $P_M$ so that in step 1112 the fastest processor performs a skimming procedure to read only relevant portions of the input data-stream and save the internal state information at $P_1, P_2, P_3 \ldots P_M$. In step 1114, a pair of splitting points and the internal state information associated with the first assigned splitting point is assigned to each of the plurality of processors as the start and stop positions for performing a scanning procedure on the portion of the input data-stream defined by the pair of splitting points. In step 1116, the second phase of the two-phase method, the plurality of processors begins decoding the input data-stream in parallel.

Figure 13:
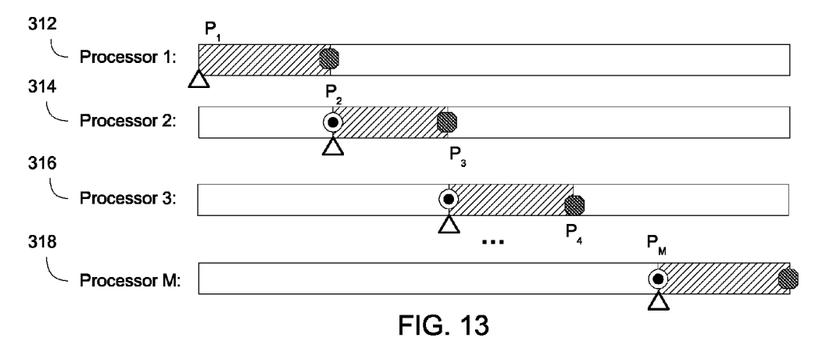
FIG. 13 is a diagram of one embodiment of implementing step 1116 of FIG. 11 according to the invention.

FIG. 13 is a diagram of one embodiment of implementing step 1116 of FIG. 11 according to the invention. Without performing any skimming procedure, each of the M processors immediately performs the scanning procedure to fully decode the portion of the input data-stream defined by the pair of splitting points assigned to it. For instance, $processor_s$ 312 performs the scanning procedure to fully decode the data between splitting point $P_1$ and splitting point $P_2$. $Processor_2$ 314 performs the scanning procedure to fully decode the data between splitting point $P_2$ and splitting point $P_3$, using the saved internal state information for splitting point $P_2$. Similarly, the other processors ($processor_3$ 316 to $processor_M$ 318) also immediately perform the scanning procedure to fully decode the portion of the input data-stream defined by their assigned splitting points. In step 1116 none of the processors needs to perform the skimming procedure because one of the processors begins decoding the input data-stream at the beginning and each of the rest of the processors has available the internal state information associated with the splitting points, which was determined in step 1114.

In another embodiment, a restoring procedure may be applied after step 1112 and before step 1114 if the saved internal state information is not assigned to the processors immediately. In the restoring procedure, a multiple-processor machine takes the internal state information saved previously at step 1112 and overwrites the current state of each processor, except for the processor that will decode the input-data stream from the beginning, with the saved internal state of the processor that performed the skimming procedure at the corresponding splitting point. The restoring procedure re-establishes the decoding state at the splitting points for each processor.

The internal state information at the splitting points can also be cached in volatile or persistent storage for later processing. For example, in image viewing software that shows a selection of thumbnail images prior to showing an image full size, the skimming procedure of the first phase of the two-phase method can be performed and the internal state information at the splitting points can be recorded while the thumbnail scan is performed. Whenever a particular image is to be displayed full size, the saved internal state information can be used to decode and then display the image quickly by using the second phase of the two-phase method.

For example, the two-phase method of FIG. 11 enables a multiple-processor machine to process a JPEG data-stream in parallel. The splitting procedure determines splitting points for a plurality of processors. In the first phase, the fastest processor in the multiple-processor machine performs the skimming procedure to decode the DC coefficient of each block in the JPEG data-stream and to save the internal state information (the value of the DC coefficient) along with the state of the JPEG decoder (the Huffman tables, quantization tables, etc) at each of the splitting points. In the second phase, each processor begins fully decoding the JPEG data-stream starting at its first assigned splitting point using the saved internal state information for that splitting point.

In a simple example, there are six MCUs in an input JPEG data-stream and each MCU contains one 8×8 block. Using the two-phase method of FIG. 11, a 3-processor machine first performs the splitting procedure to determine splitting points for the input JPEG data-stream. In this example, the splitting procedure splits the data-stream based on MCUs and determines the splitting points such that two MCUs are assigned to each processor. In the first phase, one of the three processors, preferably the fastest, performs the skimming procedure to decode the DC coefficients of the blocks (while skipping all the AC coefficients) and to save the DC coefficients of the first, third and fifth MCUs. In the second phase, using the DC coefficients of the first, third, and fifth MCUs stored during the first phase, all three processors start a scanning procedure in parallel to fully decode the entire 8×8 blocks of input data from the first, third and fifth MCU, respectively. Because all three processors can process the JPEG data-stream in parallel after the internal state information at the splitting points is determined and stored, the two-phase method of the invention makes the processing of a JPEG data-stream more efficient. Although this example was limited to a JPEG data-stream including only six 8×8 blocks of image data, the method of FIGS. 11-13 may be used to decode a JPEG data-stream including any number of MCUs and any number of 8×8 blocks of image data.

Figure 14:
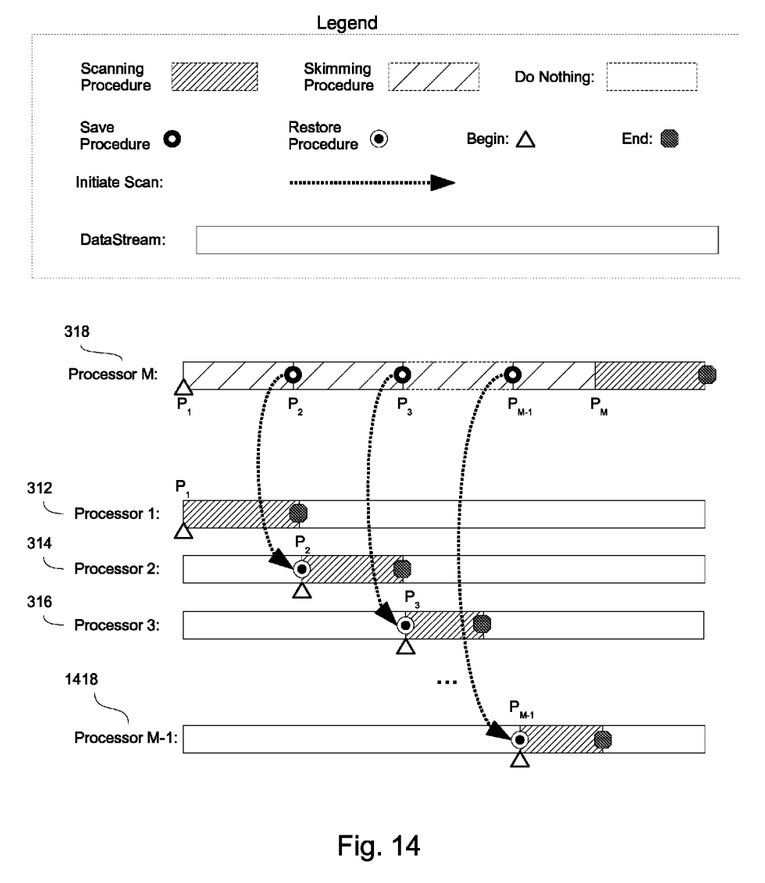
FIG. 14 is a diagram of another embodiment for decoding sequentially-dependent data using a plurality of processors in parallel according to the invention.

FIG. 14 is a diagram of another embodiment for decoding sequentially-dependent data using a plurality of processors in parallel according to the invention. A splitting procedure first determines splitting points of an input data-stream. Then one processor in a multiple-processor machine (e.g., $processor_M$ 318) performs a skimming procedure on the entire input data-stream and records the internal state information at the splitting points determined by the splitting procedure. The internal state information at each of the splitting points includes the relevant information necessary for a processor to fully decode the portion of the input data-stream starting at the splitting point. As shown in FIG. 14, for example, the splitting points are fixed at $P_1, P_2, P_3 \ldots P_M$, and so $processor_M$ 318 performs a skimming procedure to decode only relevant portions of the input data-stream and save the internal state information at $P_1, P_2, P_3 \ldots P_M$. Because $P_1$ is the beginning of the input data-steam, processor$_M$ 318 directly assigns $P_1$ to processor$_1$ 312. Processor$_1$ 312 then starts a scanning procedure to fully decode the input data-stream from $P_1$ while processor$_M$ 318 continues the skimming procedure toward $P_2$. When processor$_M$ 318 reaches $P_2$ and records the internal state information at $P_2$, it assigns $P_2$ to processor$_1$ 312 as the second splitting point (i.e., the point at which to stop the scanning procedure) and assigns $P_2$ and its internal state information to processor$_2$ 314 as its first splitting point (i.e., the point at which to start the scanning procedure). Processor$_2$ 314 then starts a scanning procedure to fully decode the input data-stream from $P_2$ while processor$_M$ 318 continues the skimming procedure toward $P_3$. As processor$_M$ 318 reaches $P_3$ and records the internal state information at $P_3$, it assigns $P_3$ to processor$_2$ 314 as the second splitting point and assigns $P_3$ and its internal state information to processor$_3$ 316 as its first splitting point. Processor$_3$ 316 then performs a scanning procedure to fully decode the input data-stream from $P_3$. This process continues until each of the M−1 processors has been assigned a pair of splitting points. Once processor$_M$ 318 reaches $P_M$, it assigns $P_M$ to processor$_M$ 1418 as the second splitting point, and stops the skimming procedure and performs a scanning procedure to fully decode the input data-stream from $P_M$ to the end of the input data-stream.

In a simple example, there are six MCUs in an input JPEG data-stream and each MCU contains one 8×8 block. Using the FIG. 14 embodiment, a 3-processor machine first performs the splitting procedure to determine splitting points for the input JPEG data-stream. In this example, the splitting procedure splits the data-stream based on MCUs and determines the splitting points such that two MCUs will be assigned to each processor. A first processor performs a skimming procedure to decode only the DC coefficients of the MCUs (while skipping all the AC coefficients) and to save the DC coefficients of the first, third, and fifth MCUs. When the first processor decodes and saves the DC coefficient of the first MCU, it assigns the first MCU and the saved DC coefficient for the first MCU to a second processor. The second processor then starts performing a scanning procedure to decode the entire 8×8 blocks of input data of the first and second MCUs while the first processor continues decoding the DC coefficients of the rest of the MCUs. When the first processor decodes and saves the DC coefficient of the third MCU, it assigns the third MCU and the saved DC coefficient for the third MCU to a third processor. The third processor then performs a scanning procedure to decode the entire 8×8 blocks of input data of the third and fourth MCUs while the first processor continues decoding the DC coefficients of the rest of the MCUs. Once the first processor reaches the fifth MCU, it stops the skimming procedure and starts performing the scanning procedure to decode the entire 8×8 blocks of input data of the fifth and sixth MCUs. Although this example was limited to a JPEG data-stream including only six 8×8 blocks of image data, the method of FIG. 14 may be used to decode a JPEG data-stream including any number of MCUs and any number of 8×8 blocks of image data.

The methods of FIGS. 4, 11, and 14 can be applied to decode different types of data formats where sequentially-dependent data is used. For example, both of these methods can be implemented to decode a Windows Bitmap File (BMP) data-stream.

While the invention has been described with reference to specific embodiments, the description is illustrative of the invention and is not to be construed as limiting the invention. Various modifications or applications may occur to those skilled in the art without departing from the true spirit and scope of the invention. For example, in addition to operating on compressed or encrypted data, this invention can also be applied to other kinds of data processing where the underlying data-stream has certain sequential dependency among its constituent elements.

What is claimed is:

1. A method for decoding encoded data in a system including a plurality of processing units, the method comprising:
   determining at least one splitting point in a data-stream of encoded data such that the data-stream is divided into at least two portions;
   assigning one portion of the data-stream to each of the plurality of processing units for decoding;
   performing a skimming procedure by at least one of the plurality of processing units to decode relevant data for at least one portion of the data-stream, the relevant data being sufficient to enable one of the plurality of processing units to fully decode another portion of the data-stream; and
   decoding the data-stream of encoded data by the plurality of processing units substantially in parallel where each processing unit fully decodes at least one portion of the input data-stream.

2. The method of claim 1, wherein the data-stream comprises sequentially-dependent data.

3. The method of claim 1, wherein the data-stream comprises data encoded using a Discrete Cosine Transform.

4. The method of claim 3, wherein the relevant data comprise DC coefficients of the encoded data.

5. The method of claim 1, wherein the data-stream comprises data encoded using a data format of Joint Photographic Experts Group (JPEG).

6. The method of claim 5, wherein the relevant data comprise DC coefficients of the encoded data.

7. The method of claim 1, wherein the data-stream comprises encrypted data.

8. The method of claim 1, wherein the data-stream comprises compressed data.

9. The method of claim 1, wherein the at least two portions of the data-stream are of different size.

10. A method for decoding encoded data in a system including a plurality of processing units, the method comprising:
    determining at least one splitting point in a data-stream of encoded data such that the data-stream is divided into a plurality of portions;
    performing a skimming procedure by at least one of the plurality of processing units to decode relevant data for at least one portion of the data-stream, the relevant data being sufficient to enable at least one of the plurality of processing units to fully decode another portion of the data-stream;
    recording internal state information of the at least one of the plurality of processing units when the skimming procedure has reached the at least one splitting point;
    assigning one portion of the data-stream to each of the plurality of processing units for decoding;
    providing the internal state information to at least one of the plurality of processing units; and
    decoding the data-stream of encoded data by the plurality of processing units substantially in parallel where each processing unit fully decodes its assigned portion of the data-stream.

11. The method of claim 10, wherein the data-stream comprises sequentially-dependent data.

12. The method of claim 10, wherein the data-stream comprises data encoded using a Discrete Cosine Transform.

13. The method of claim 12, wherein the relevant data comprise DC coefficients of the encoded data.

14. The method of claim 10, wherein the data-stream comprises data encoded using a data format of Joint Photographic Experts Group (JPEG).

15. The method of claim 14, wherein the relevant data comprise DC coefficients of the encoded data.

16. The method of claim 15, wherein the internal state information comprises the DC coefficients at the at least one splitting point.

17. The method of claim 10, wherein the data-stream comprises encrypted data.

18. The method of claim 10, where in the data-stream comprises compressed data.

19. A system for decoding encoded data comprising:
   a plurality of processing units;
   a splitting module coupled to each of the plurality of processing units, the splitting module configured to determine portions of a data-stream of encoded data and to assign at least one portion of the data-stream to at least one of the plurality of processing units;
   a scanning module coupled to each of the plurality of processing units, the scanning module configured to instruct each of the plurality of processing units to fully decode at least one portion of the data-stream; and
   a skimming module coupled to each of the plurality of processing units, the skimming module configured to instruct at least one of the plurality of processing units to decode relevant data for at least a portion of the data-stream, the relevant data being sufficient to enable at least one of the plurality of processing units to fully decode its assigned portion of the data stream.

20. The system of claim 19, wherein the data-stream comprises sequentially-dependent data.

21. The system of claim 19, wherein the data-stream comprises data encoded using a Discrete Cosine Transform.

22. The system of claim 21, wherein the relevant data comprise DC coefficients of the encoded data.

23. The system of claim 19, wherein the data-stream comprises data encoded using a data format of Joint Photographic Experts Group (JPEG).

24. The system of claim 23, wherein the relevant data comprise DC coefficients of the encoded data.

25. The system of claim 19, wherein the skimming module is configured to select only one of the plurality of processing units for decoding relevant data for the data-stream.

26. The system of claim 25, wherein the splitting module is further configured to record internal state information of at least one of the plurality of processing units after that processing unit has decoded the relevant data for at least portion of the data-stream.

27. The system of claim 26, wherein the data-stream comprises data encoded using a Discrete Cosine Transform.

28. The system of claim 27, wherein the relevant data comprise DC coefficients of the encoded data.

29. The system of claim 26, wherein the data-stream comprises data encoded using a data format of Joint Photographic Experts Group (JPEG).

30. The system of claim 29, wherein the relevant data comprise DC coefficients of the encoded data.

31. The system of claim 30, wherein the internal state information comprises the DC coefficients.

* * * * *